United States Patent [19]

Dattilo

[11] 3,734,373

[45] May 22, 1973

[54] CARTRIDGE TAPE RECORDER/REPRODUCER STRIPPER ASSEMBLY

[75] Inventor: Donald J. Dattilo, Mount Prospect, Ill.

[73] Assignee: Motorola, Inc., Franklin Park, Ill.

[22] Filed: Feb. 19, 1971

[21] Appl. No.: 116,933

[52] U.S. Cl. ....................... 226/196, 226/5, 226/190

[51] Int. Cl. ............................................ B65h 23/04

[58] Field of Search....................... 226/181, 190, 194, 226/197, 187, 196

[56] References Cited

UNITED STATES PATENTS

| | | | |
|---|---|---|---|
| 3,581,966 | 6/1971 | Huber | 226/194 X |
| 2,590,665 | 3/1952 | Williams | 226/187 X |
| 3,608,805 | 9/1971 | Ogata | 226/181 X |
| 3,462,057 | 8/1969 | Yamamoto | 226/196 X |

*Primary Examiner*—Allen N. Knowles
*Assistant Examiner*—Gene A. Church
*Attorney*—Mueller & Aichele

[57] ABSTRACT

A stripper assembly for maintaining a minimum clearance between the capstan shaft and stripper edge in a cartridge tape recorder and/or reproducer, which includes a body having resilient fingers or annular base portions for connecting the stripper member in spaced relation to the capstan shaft. A projection on the wall of the body engages the capstan shaft support to hold the stripper member in a fixed position with respect to the capstan shaft. The annular base portions or fingers include bearing members for a close running fit with said capstan shaft.

3 Claims, 6 Drawing Figures

Inventor
DONALD J. DATTILO
BY Mueller & Aichele
ATTYS.

CARTRIDGE TAPE RECORDER/REPRODUCER STRIPPER ASSEMBLY

BACKGROUND OF THE INVENTION

This invention relates to a tape stripper assembly for cartridge tape recorders and/or reproducers.

In the past, loose loops of slack in the tape leaving the driving mechanism of the capstan and pinch roller combination of a tape recorder have caused problems because the tape loops have become entangled around the capstan shaft eventually causing the tape to become so entwined that it had to be broken to remove the cartridge from the player. Also, where the capstan shaft became sticky the tape stuck to the capstan shaft and with insufficient tension in the takeup of tape, the tape has become twisted and tangled around the capstan shaft. Several methods have been used to solve this problem. In the past strippers have been proposed to prevent the tape from becoming entwined around the capstan shaft but they have been costly because of the difficulty in indexing the stripper to the capstan shaft within the desired tolerances.

SUMMARY

It is, therefore, an object of the present invention to provide a stripper assembly for the capstan shaft of a cartridge tape recorder or reproducer that is inexpensive and which can be easily positioned in the desired spaced relationship to the capstan shaft.

In one embodiment of the present invention the stripper assembly includes an arcuate portion of a hollow cylinder having a diameter larger than the diameter of the capstan shaft. Each annular base portion has a diameter greater than the capstan shaft and is defined by an arc greater than a semicircle which forms a flexible finger for engaging the capstan shaft. The stripper is integral with the arcuate inner wall of the hollow cylinder and extends inwardly in a spaced relation of said capstan shaft with said fingers to connect the same to the capstan shaft. A projection on the outer wall of the arcuate portion engages the capstan shaft housing to fix the stripper with respect to the capstan shaft. In another embodiment, instead of the base portions having fingers, the base portions are completely annular structures.

DETAILED DESCRIPTION

Figures 1, 2, 3, 4, 5, 6:
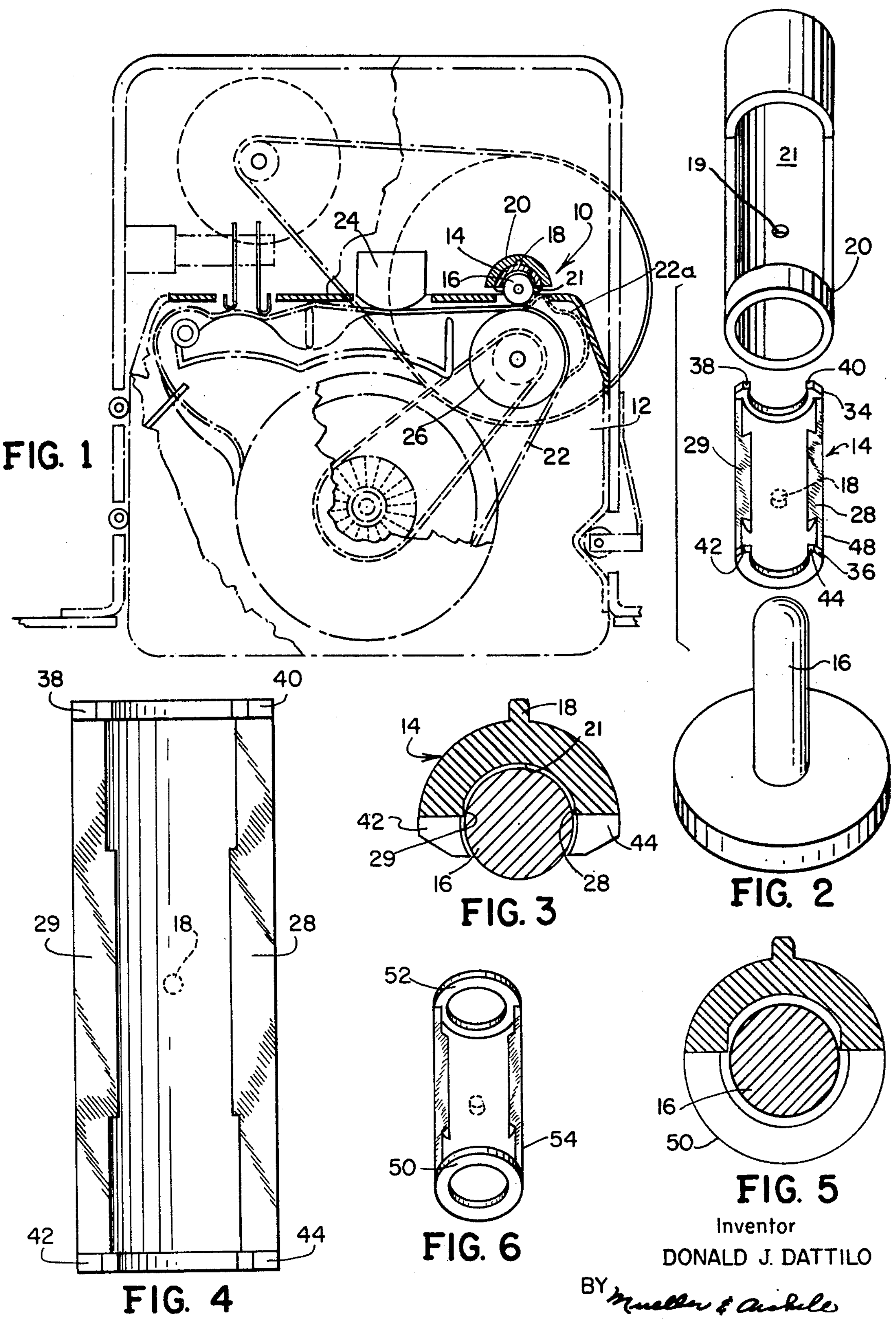
FIG. 1 is a cutaway view of a cartridge tape recorder with a cartridge engaged in the play mode.
FIG. 2 is an exploded perspective view of a capstan shaft, housing and stripper assembly in accordance with this invention.
FIG. 3 is a plan view in cross-section of a capstan shaft and stripper assembly in accordance with this invention.
FIG. 4 is a front elevation view of the stripper assembly of FIG. 3.
FIG. 5 is a plan view in cross-section of a capstan shaft and stripper assembly illustrating a further embodiment of this invention.
FIG. 6 is a perspective view of the stripper assembly of FIG. 5.

Referring first to FIG. 1, there is shown a portion of a cartridge tape recorder 10 shown in phantom with a cartridge 12 engaged for the play mode. A stripper assembly 14 is shown connected to the capstan shaft 16 and held in position by projection 18 which is on the stripper assembly and fits into a recess or aperture 19 (FIG. 2) in the capstan housing 20. The member is consequently prevented from rotating around the capstan shaft.

During the play mode as shown in FIG. 1 tape 22 moves from left to right, passing the transducer 24 and pressing between the front side of the capstan shaft 16 and the pinch roller 26. Should slack develop as the tape leaves the passage between the capstan shaft 16 and pinch roller 26 the tape might form a free loop. The tape may be biased against the capstan shaft and against the inside of the cartridge case because of this free loop as is shown by 22*a* in FIG. 1. The loop of tape may enter the space between the capstan shaft 16 and capstan housing 20, which includes a wall portion 21 positioned on the back side of the capstan shaft were it not for the stripper portion 28 of the assembly 14. As more tape becomes a part of the loop its shape becomes less and less predictable. The possibility increases that tape will wind around the capstan shaft if no stripper is present.

FIG. 2 shows an exploded view of the capstan shaft 16, stripper member 14 and capstan housing 20. The stripper assembly 14 includes a body 48 formed from the arcuate portion of a hollow cylinder connected between an upper base portion 34 and lower base portion 36 each of which have fingers 38, 40 and 42, 44 respectively for connection with the capstan shaft. Each of the base portions have bore diameters approximating the diameter of the capstan shaft and are in axial alignment. For instance in one embodiment the bore diameters were between 0.281 and 0.285 inch while the capstan shaft diameter was between 0.2430 and 0.2435 inch. The fingers 38, 40, 42 and 44 permit the assembly to be clipped on the capstan shaft.

The combination of the structure and the bases hold the stripper portion 28 in the desired spaced relation with the capstan shaft 16 which is on the order of 3 mils. The projection 18 is on the outside surface of the arcuate body portion of the stripper assembly 14. This arcuate portion is semicircular and is struck from an arc having a diameter greater than the diameter of the bore diameter of each of the base portions. As can be seen in FIGS. 3 and 4 only the annular base portions engage the capstan shaft. The friction surface area is consequently very definitely limited and because the bases are made of a self-lubricating material such as nylon or plastic, they act as bearings and permit free rotation of the capstan shaft. For ease of assembly, an additional stripper portion 29 may be attached to the arcuate portion of the hollow cylinder opposite the stripper portion 28 so that no matter which base is used as the top or bottom, the stripper assembly will function.

An important aspect of this invention is the relationship between the base portions 34 and 36 of the stripper assembly and the location of the stripper portion 28 relative to the same. With the fingers 38, 40 and 42, 44 of the base portion clipped about the capstan shaft, they effectively index the stripper portion 28 to the shaft in the desired spaced relation. Subsequently the projection 18 is inserted into the aperture 19 of the wall portion of the capstan support to thereby index the entire assembly relative to the shaft and tape path.

FIGS. 5 and 6 illustrate another embodiment 54 of the invention. Instead of the partial annular base portions having fingers, the bases 50 and 52 in this embodiment are completely annular structures. Instead of clipping the stripper assembly to the capstan shaft 16, the stripper assembly must be fitted over an end of the shaft 16. Again, a close running fit is provided.

What has been described, therefore, is an economically produced stripper assembly for a tape player which can be easily assembled in the player and yet in a simple manner provides the desired spaced relation between the stripper and capstan shaft.

I claim:

1. A cartridge tape recorder and/or reproducer including in combination a capstan shaft, a housing for mounting the same in said recorder and/or reproducer, a stripper member separate from the housing for preventing the tape medium from becoming entangled around said capstan shaft, connecting means integral with said stripper member for attaching said stripper member to said capstan shaft in a close running fit therewith, said connecting means including first and second flexible finger portions joined by an arcuate portion of a hollow cylinder having a diameter larger than the diameter of said capstan shaft, said stripper member being integral with the arcuate inner wall of the hollow cylinder and extending inwardly in a spaced relation of said capstan shaft with said flexible fingers connecting the same to the capstan shaft, and a projection on the outer wall of said arcuate portion, said projection engaging said capstan shaft housing to fix said stripper member with respect to said capstan shaft.

2. A cartridge tape recorder and/or reproducer including in combination, a capstan shaft, a housing for mounting the same in said recorder and/or reproducer, a stripper member for preventing the tape medium from becoming entangled around said capstan shaft, connecting means integral with said stripper member for attaching said stripper member to said capstan shaft in a close running fit therewith, said connecting means including an arcuate portion of a hollow cylinder formed from a diameter larger than the diameter of said capstan shaft and having first and second annular base portions, each of said base portions having a bore diameter approximating the diameter of said capstan shaft, said stripper member being integral with the wall of said arcuate portion and being connected in a spaced relation with respect to said capstan shaft by said shaft extending through said annular base portions in a close running fit therewith, and a projection extending from the outer wall of said arcuate portion of said connecting means, said projection engaging said capstan shaft housing to fix said stripper member from rotating relative to said capstan shaft.

3. The cartridge tape recorder and/or reproducer according to claim 2 wherein said connecting means is made of a self-lubricating material so said capstan shaft will rotate freely within said annular base portions.

* * * * *